(12) United States Patent
Maeda et al.

(10) Patent No.: US 11,600,181 B2
(45) Date of Patent: Mar. 7, 2023

(54) SADDLE-RIDING TYPE VEHICLE

(71) Applicant: HONDA MOTOR CO., LTD., Tokyo (JP)

(72) Inventors: Hiroshi Maeda, Wako (JP); Hiroshi Tatsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 17/440,805

(22) PCT Filed: Mar. 28, 2019

(86) PCT No.: PCT/JP2019/013807
§ 371 (c)(1),
(2) Date: Sep. 20, 2021

(87) PCT Pub. No.: WO2020/194715
PCT Pub. Date: Oct. 1, 2020

(65) Prior Publication Data
US 2022/0165160 A1 May 26, 2022

(51) Int. Cl.
*G08G 1/16* (2006.01)
*B60Q 1/26* (2006.01)
(Continued)

(52) U.S. Cl.
CPC ........... *G08G 1/167* (2013.01); *B60Q 1/2665* (2013.01); *B60Q 1/525* (2013.01); *B60Q 5/005* (2013.01)

(58) Field of Classification Search
CPC ...... G08G 1/167; B60Q 1/2665; B60Q 1/525; B60Q 5/005
See application file for complete search history.

(56) References Cited

U.S. PATENT DOCUMENTS

| 7,304,651 B2 * | 12/2007 | Ishida | H04N 7/181 348/E7.086 |
| 2004/0178893 A1 * | 9/2004 | Litkouhi | H04R 5/02 340/435 |

(Continued)

FOREIGN PATENT DOCUMENTS

| CN | 1759024 | 4/2006 |
| CN | 103587465 | 2/2014 |

(Continued)

OTHER PUBLICATIONS

Chinese Office Action for Chinese Patent Application No. 201980094268.7 dated Jul. 15, 2022.
(Continued)

*Primary Examiner* — Hoi C Lau
(74) *Attorney, Agent, or Firm* — Amin, Turocy & Watson, LLP

(57) ABSTRACT

A saddle-riding type vehicle includes: a front object recognition unit (54) which recognizes an object in front of a host vehicle (M); a side object recognition unit (54) which recognizes an object at the rear side of the host vehicle (M); a display unit (42) which notifies a driver of the existence of an object in the periphery of the host vehicle (M); and a notification control unit (160) which determines the existence of an object in front of the host vehicle (M) and the existence of an object at the rear side of the host vehicle (M) on the basis of the recognition result of the front object recognition unit (54) and the side object recognition unit (54) and controls the display unit (42). The notification control unit (160) controls, when it is determined that there is an object at the rear side of the host vehicle (M), the display unit (42) to display a first notification (A1) and controls, when it is determined that there are an object at the rear side of the host vehicle (M) and there is an object in
(Continued)

front of the host vehicle (M), the display unit (42) to display a second notification (A2) different from the first notification (A1).

6 Claims, 10 Drawing Sheets

(51) Int. Cl.
*B60Q 1/50* (2006.01)
*B60Q 5/00* (2006.01)

(56) References Cited

U.S. PATENT DOCUMENTS

| | | | | |
|---|---|---|---|---|
| 2007/0058257 A1* | 3/2007 | Lynam | .................. | B60Q 1/0023 359/604 |
| 2007/0182527 A1* | 8/2007 | Traylor | .................. | G08G 1/165 340/435 |
| 2010/0066518 A1* | 3/2010 | Ohshima | .................. | B60R 1/00 348/118 |
| 2011/0025489 A1* | 2/2011 | Shimoda | .................. | B60R 1/00 340/459 |
| 2011/0128136 A1* | 6/2011 | Katoh | .................. | G08G 1/164 340/435 |
| 2012/0147613 A1* | 6/2012 | Goldschmidt | ....... | G02B 6/0001 362/494 |
| 2012/0327238 A1* | 12/2012 | Satoh | .................. | G06V 20/58 348/148 |
| 2014/0300743 A1* | 10/2014 | Kumon | .................. | G06T 11/00 348/148 |
| 2017/0132481 A1* | 5/2017 | Sato | .................. | G01C 21/3602 |
| 2018/0137791 A1* | 5/2018 | Osumi | .................. | B60Q 9/00 |
| 2020/0346704 A1* | 11/2020 | Mochizuki | ............. | B60Q 1/381 |
| 2022/0165160 A1* | 5/2022 | Maeda | .................. | B60W 50/14 |

FOREIGN PATENT DOCUMENTS

| | | |
|---|---|---|
| CN | 203623524 | 6/2014 |
| JP | 2010-097270 | 4/2010 |
| JP | 2011-118483 | 6/2011 |
| JP | 2015-209061 | 11/2015 |
| JP | 5836490 | 12/2015 |
| JP | 2016-024778 | 2/2016 |
| JP | 2018-135003 | 8/2018 |
| KR | 10-2017-0058188 | 5/2017 |
| WO | 2017/155199 | 9/2017 |

OTHER PUBLICATIONS

International Search Report and Written Opinion for International Application No. PCT/JP2019/013807 dated Jun. 4, 2019, 8 pages.
Indian Office Action for Indian Patent Application No. 202117041064 dated Mar. 31, 2022.

* cited by examiner

SADDLE-RIDING TYPE VEHICLE

TECHNICAL FIELD

The present invention relates to a saddle-riding type vehicle.

BACKGROUND ART

In the related art, as a kind of driving assistance system for automobiles such as four-wheeled vehicles, there is a technique for notifying a driver of the existence of a vehicle traveling at the rear side of a host vehicle which is a blind spot for the driver (for example, refer to Patent Literature 1). Patent Literature 1 discloses a driving assistance device which includes an image-capturing unit provided on a side mirror on a second side of a vehicle and capable of imaging a rear side region of the vehicle and a blind spot region adjacent to the rear side region and outside of a visible range of the side mirror on the second side and a display unit configured to display a video captured by the photographing unit so that the driver of the vehicle can view the video. Furthermore, there is a technique for alerting the driver by displaying the existence of the vehicle traveling in the blind spot region of the driver on the side mirror.

CITATION LIST

Patent Literature

[Patent Literature 1]
Japanese Patent No. 5836490

SUMMARY OF INVENTION

Technical Problem

Incidentally, in a saddle-riding type vehicle, a driver wears a helmet and drives with a narrow field of vision. For this reason, when the driver is looking toward, for example, a side mirror, the driver may not be able to recognize an object in front of the vehicle.

The present invention provides a saddle-riding type vehicle capable of allowing the driver to recognize an object in front of the vehicle even when a driver is looking to one side.

Solution to Problem (1) A saddle-riding type vehicle according to an aspect of the present invention includes: a front object recognition unit (54) which recognizes an object in front of a host vehicle (M); a side object recognition unit (54) which recognizes an object at the rear side of the host vehicle (M); a display unit (42) which notifies a driver of the existence of an object in the vicinity of the host vehicle (M); and a notification control unit (160) which determines the existence of an object in front of the host vehicle (M) and the existence of an object at the rear side of the host vehicle (M) on the basis of the recognition result of the front object recognition unit (54) and the side object recognition unit (54) and controls the display unit (42), wherein the notification control unit (160) performs control such that, when it is determined that there is an object at the rear side of the host vehicle (M), the display unit (42) displays a first notification (A1) and performs control such that, when it is determined that there is an object at the rear side of the host vehicle (M) and there is an object in front of the host vehicle (M), the display unit (42) displays a second notification (A2) different from the first notification (A1).

According to the aspect, it is possible to change the display mode of the display unit in accordance with the existence of an object in front of the host vehicle. For this reason, when a driver is looking at the first notification displayed by the display unit, the driver can recognize that an object exists in front of the host vehicle by displaying the second notification different from the first notification. Therefore, even when the driver is looking to the side, the driver can recognize an object existing in front of the vehicle.

(2) In the saddle-riding type vehicle according to the above aspect (1), the notification control unit (160) may change a display mode of the second notification (A2) in accordance with a vehicle speed of the host vehicle (M).

When the vehicle speed of the host vehicle increases, the host vehicle is more likely to approach an object in front of the host vehicle. Thus, the degree of danger to the host vehicle increases. With the above constitution, it is possible to change the display mode of the second notification in accordance with the magnitude of the degree of danger to the host vehicle. Therefore, the driver can more reliably recognize the existence of an object in front of the vehicle.

(3) In the saddle-riding type vehicle according to the above aspect (1) or (2), the saddle-riding type vehicle may include: a warning sound generation unit (56) which emits a warning sound, wherein the notification control unit (160) may control the warning sound generation unit (56) so that a warning sound is emitted when the vehicle speed has not decreased by a prescribed value or more within a prescribed time after the second notification (A2) has been displayed.

When the vehicle speed has not decreased by the prescribed value or more before the prescribed time has elapsed after the second notification has been displayed, the driver is likely not to recognize an object in front of the host vehicle in some cases. That is to say, the driver is likely not to be looking at the second notification in some cases. With the above constitution, it is possible to notify the driver of the existence of an object in front of the host vehicle using a warning sound. Therefore, the driver can more reliably recognize the existence of an object in front of the vehicle.

(4) In the saddle-riding type vehicle according to any one of the above aspects (1) to (3), the display unit (42) may be provided on a side mirror (40) and display at least part of the second notification (A2) at a place on a mirror surface (41) of the side mirror (40) further inside in a vehicle width direction than an intermediate portion (Cm) in the vehicle width direction.

When the constitution is provided as described above, for example, when the driver is looking at the vicinity of an outer end portion of the mirror surface of the side mirror in the vehicle width direction, at least part of the second notification is displayed at a position on a side closer to a center of the vehicle in a vehicle width from the line-of-sight direction of the driver. For this reason, the second notification is displayed at a place in which the line of sight of the driver is likely to pass through. Therefore, the driver can more reliably recognize the existence of an object in front of the vehicle.

Advantageous Effects of Invention

According to the saddle-riding type vehicle described above, even when a driver is looking to the side, the driver can recognize an object existing in front of a vehicle.

DESCRIPTION OF EMBODIMENTS

An example of a driving assistance system of a saddle-riding type vehicle in this embodiment will be described below with reference to the drawings. In the embodiment, it is assumed that the driving assistance system is applied to an automatic driving vehicle. Automatic driving is a type of driving assistance in which a vehicle travels in a state in which the vehicle does not require a manipulation by a driver in principle. Here, there are degrees of driving assistance. For example, the degrees of driving assistance may include a first degree in which the driving assistance is performed when a driving assistance device such as an adaptive cruise control system (ACC) and a lane keeping assistance system (LKAS) operates, a second degree which has a degree of control higher than that of the first degree and in which, although automatic driving is performed by automatically controlling at least one of acceleration/deceleration or steering of the vehicle without a driver's manipulation performed on a driving manipulator of a vehicle, a certain degree of vicinity monitoring obligation is imposed on a driver, and a third degree which is a degree of control higher than that of the second degree and in which a peripheral monitoring obligation is not imposed on a driver (or a peripheral monitoring obligation lower than that of the second degree is imposed). In the embodiment, the driving assistances of the second degree and the third degrees correspond to automatic driving.

<Overall Constitution>

Figure 1:
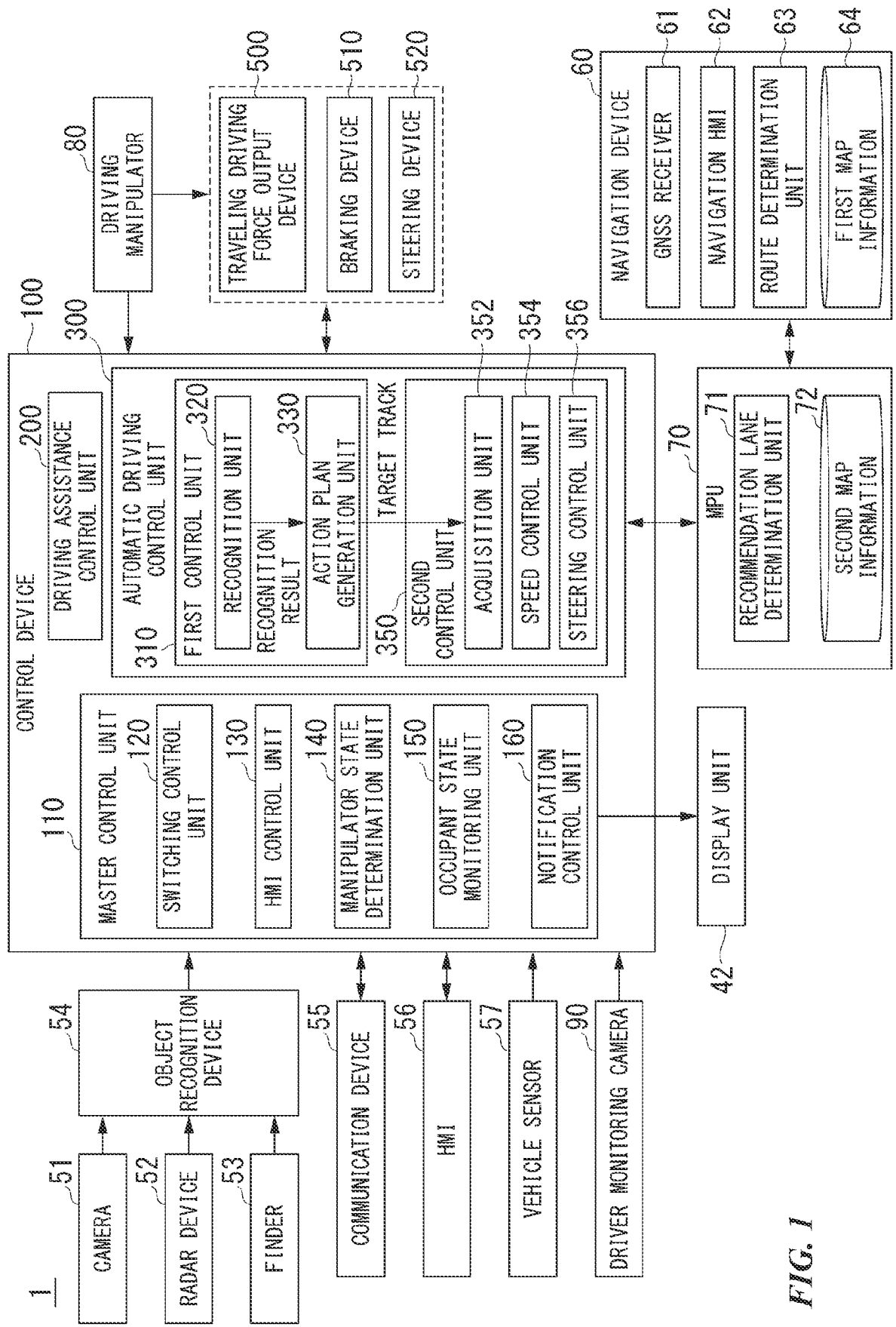
FIG. 1 is a diagram showing a constitution of a driving assistance system according to a first embodiment.

FIG. 1 is a diagram showing a constitution of a driving assistance system in a first embodiment.

A vehicle having a driving assistance system 1 shown in FIG. 1 installed therein is a saddle-riding type vehicle such as a two-wheeled vehicle or a three-wheeled vehicle. A prime mover for the vehicle is an internal combustion engine such as a gasoline engine, an electric motor, or a combination of an internal combustion engine and an electric motor. An electric motor operates using electric power generation by means of a generator joined to an internal combustion engine or a discharge power of a secondary battery or a fuel cell.

For example, the driving assistance system 1 includes a camera 51, a radar device 52, a finder 53, an object recognition device 54 (a front object recognition unit and a side object recognition unit), a communication device 55, a human machine interface (HMI) 56, a vehicle sensor 57, a navigation device 60, a map positioning unit (MPU) 70, a driving manipulator 80, a driver monitoring camera 90, a control device 100, a traveling driving force output device 500, a braking device 510, a steering device 520, and a line-of-sight guidance unit 530. These devices and apparatuses are connected to each other by means of multiplex communication lines such as controller area network (CAN) communication lines, serial communication lines, wireless communication networks, and the like. The constitution shown in FIG. 1 is merely an example. In addition, part of the constitution may be omitted or another constitution may be added.

The camera 51 is, for example, a digital camera having a solid-state image sensor such as a charge coupled device (CCD) and a complementary metal oxide semiconductor (CMOS) utilized therein. The camera 51 is attached to an arbitrary place on a vehicle having the driving assistance system 1 installed therein (hereinafter referred to as a "host vehicle M"). For example, the camera 51 periodically and repeatedly captures, the periphery of the host vehicle M. The camera 51 may be a stereo camera.

The radar device 52 radiates radio waves such as millimeter waves around the host vehicle M, detects radio waves (reflected waves) reflected by an object and at least detects the position (a distance and a direction) of the object. The radar device 52 is attached to an arbitrary place on the host vehicle M. The radar device 52 may detect a position and a speed of an object by means of a frequency modulated continuous wave (FM-CW) method.

The finder 53 is a light detection and ranging (LIDAR) device. The finder 53 irradiates the periphery of the host vehicle M with light and measures scattered light. The finder 53 detects a distance from a target on the basis of the time from light emission to light reception. The irradiated light is, for example, a pulsed laser beam. The finder 53 is attached at an arbitrary position on the host vehicle M.

The object recognition device 54 performs sensor fusion processing on the detection results of part or all of the camera 51, the radar device 52, and the finder 53 and recognizes the position, the type, the speed, and the like of an object in the periphery of the host vehicle M. Objects in the periphery of the host vehicle M include at least an object in front of the host vehicle M and an object at the rear side of the host vehicle M. The object recognition device 54 outputs a recognition result to the control device 100. The object recognition device 54 may output the detection results of the camera 51, the radar device 52, and the finder 53 to the control device 100 as they are.

The communication device 55 communicates with other vehicles in the periphery of the host vehicle M (inter-vehicle communication) using, for example, a cellular network, a Wi-Fi network, Bluetooth (registered trademark), dedicated short range communication (DSRC), or the like or communicates with various server devices via a radio base station.

The HMI 56 presents various information to a driver of the host vehicle M and receives an input manipulation by the driver. The HMI 56 includes various display devices, speakers, buzzers, touch panels, switches, keys, and the like. One or both of speakers and buzzers emit a warning sound.

The vehicle sensor 57 includes a vehicle speed sensor configured to detect the speed of the host vehicle M, an acceleration sensor configured to detect an acceleration, a yaw rate sensor configured to detect an angular velocity around a vertical axis, an orientation sensor configured to detect a direction of the host vehicle M, and the like.

The navigation device 60 includes, for example, a global navigation satellite system (GNSS) receiver 61, a navigation HMI 62, and a route determination unit 63. The navigation device 60 holds first map information 64 in a storage device such as a hard disk drive (HDD) and a flash memory. The GNSS receiver 61 specifically identifies a position of the host vehicle M on the basis of a signal received from a GNSS satellite. The position of the host vehicle M may be specifically identified or complemented by means of an inertial navigation system (INS) in which an output of the vehicle sensor 57 is utilized. The navigation HMI 62 includes a display device, a speaker, a touch panel, a key, and the like. The navigation HMI 62 may be partially or wholly shared with the HMI 56 described above. The route determination unit 63 determines a route from the position of the host vehicle M specifically identified by means of the GNSS receiver 61 (or an input arbitrary position) to a destination input by an occupant using the navigation HMI 62 (hereinafter referred to as a "route on a map") with reference to the first map information 64. The first map information 64 is, for example, information in which a road shape is expressed using, for example, links indicating roads and nodes connected through the links. The first map information 64 may include a curvature of a road, point of interest (POI) information, and the like. The route on a map is output to the MPU 70. The navigation device 60 may provide route guidance using the navigation HMI 62 on the basis of the route on a map. The navigation device 60 may be realized by, for example, a function of a terminal device such as a Smartphone or a tablet terminal owned by an occupant. The navigation device 60 may transmit a current position and a destination to a navigation server via the communication device 55 and acquire a route equivalent to the route on a map from the navigation server.

The MPU 70 includes, for example, a recommendation lane determination unit 71. The MPU 70 holds second map information 72 in a storage device such as an HDD or a flash memory. The recommendation lane determination unit 71 divides the route on a map provided from the navigation device 60 into a plurality of blocks (for example, divides the route for every 100 [m] with respect to a direction in which the vehicle moves forward) and determines a recommendation lane for each block with reference to the second map information 72. The recommendation lane determination unit 71 determines the number of lanes from the leftmost lane on which a vehicle should travel. The recommendation lane determination unit 71 determines, when a branch place exists on the route on a map, a recommendation lane so that the host vehicle M can travel on a reasonable route to move forward to a branch destination.

The second map information 72 is map information with higher accuracy than the first map information 64. The second map information 72 includes, for example, information concerning the center of the lane, information regarding a boundary of the lane, and the like. Furthermore, the second map information 72 may include road information, traffic regulation information, address information (an address/a zip code), facility information, telephone number information, and the like. The second map information 72 may be updated at any time by means of the communication device 55 configured to communicate with other devices.

The driving manipulator 80 includes, for example, a manipulator such as an accelerator grip, a brake pedal, a brake lever, a shift pedal, and a steering handle. A sensor configured to detect an amount of manipulation or the existence or absence of manipulation is attached to the driving manipulator 80. The detection results of the sensor are output to the control device 100 or part or all of the traveling driving force output device 500, the braking device 510, and the steering device 520.

The driver monitoring camera 90 is disposed at a position in which the driver monitoring camera 90 can capture a driver who is sitting on a seat. For example, the driver monitoring camera 90 is attached to the front portion of the host vehicle M. The driver monitoring camera 90 captures, for example, an image so that the face of the driver who is sitting on a seat is arranged at the center. The driver monitoring camera 90 is a digital camera in which a solid-state image sensor such as a CCD and a CMOS is utilized. For example, the driver monitoring camera 90 periodically images a driver. The captured image of the driver monitoring camera 90 is output to the control device 100.

The control device 100 includes a master control unit 110, a driving assistance control unit 200, and an automatic driving control unit 300. The master control unit 110 may be integrated into either the driving assistance control unit 200 or the automatic driving control unit 300.

The master control unit 110 switches a degree of driving assistance and controls the HMI 56. For example, the master control unit 110 includes a switching control unit 120, an HMI control unit 130, a manipulator state determination unit 140, an occupant state monitoring unit 150, and a notification control unit 160. The switching control unit 120, the HMI control unit 130, the manipulator state determination unit 140, and the occupant state monitoring unit 150 are realized through a program executed by a processor such as a central processing unit (CPU). Furthermore, some or all of these functional units may be realized through hardware such as a large scale integration (LSI), an application specific integrated circuit (ASIC), and a field-programmable gate array (FPGA) and may be realized through software and hardware which cooperate together.

The switching control unit 120 switches a degree of driving assistance on the basis of, for example, a manipulation signal input from a prescribed switch included in the HMI 56. Furthermore, the switching control unit 120 may cancel a driving assistance and perform switching to manual driving on the basis of, for example, a manipulation of instructing the driving manipulator 80 such as the accelerator grip, the brake pedal, the brake lever, and the steering handle to perform acceleration, deceleration, or steering.

The switching control unit 120 may switch a degree of driving assistance on the basis of an action plan generated by means of an action plan generation unit 330 which will be described later. For example, the switching control unit 120 may end the driving assistance at a scheduled end point of the automatic driving defined using the action plan.

The HMI control unit 130 causes the HMI 56 to output a notification or the like associated with switching of a degree of driving assistance. Furthermore, the HMI control unit 130 switches the details to be output to the HMI 56 when a prescribed event occurs for the host vehicle M. In addition, the HMI control unit 130 may cause the HMI 56 to output information regarding the determination result of one or both of the manipulator state determination unit 140 and the occupant state monitoring unit 150. Moreover, the HMI control unit 130 may output the information received by the HMI 56 to one or both of the driving assistance control unit 200 and the automatic driving control unit 300.

The manipulator state determination unit 140 determines, for example, whether the steering handle included in the driving manipulator 80 is in a manipulated state (specifically, when an intentional manipulation is actually being performed, this means a state in which a manipulation can be performed immediately or a gripping state).

The occupant state monitoring unit 150 monitors a driver's condition on the basis of the captured image of the driver monitoring camera 90. The occupant state monitoring unit 150 monitors whether the driver is continuously monitoring the traffic conditions in the surrounding region. The occupant state monitoring unit 150 acquires the driver's face image from the captured image of the driver monitoring camera 90 and recognizes the driver's line-of-sight direction from the acquired face image. For example, the occupant state monitoring unit 150 may recognize a line-of-sight direction of an occupant from the captured image of the driver monitoring camera 90 through deep learning using a neural network or the like.

The notification control unit 160 determines the existence of an object in front of the host vehicle M and the existence of an object at the rear side of the host vehicle M on the basis of the recognition result of the object recognition device 54. The notification control unit 160 determines the existence of another vehicle (another vehicle B2) located in a path of the host vehicle M. Furthermore, the notification control unit 160 determines the existence of another vehicle (another vehicle B1) located in a blind spot region that is a blind spot of the side mirror or predicted to enter the blind spot region in a region at the rear side of the host vehicle M. The notification control unit 160 may estimate a blind spot region based on an angle of the side mirror, a position of a driver's head, and the like. The notification control unit 160 controls a speaker or a buzzer of the HMI 56 and an indicator 42 which will be described later on the basis of the determination result of the existence of the other vehicles B1 and B2 and alerts a driver J. Furthermore, the notification control unit 160 may control a device worn by the driver J such as a helmet using communication such as Bluetooth (registered trademark) via the communication device 55.

The driving assistance control unit 200 performs the first degree of driving assistance. The driving assistance control unit 200 performs, for example, ACC, LKAS, or other driving assistance control. For example, the driving assistance control unit 200 controls, when performing ACC, the traveling driving force output device 500 and the braking device 510 so that the host vehicle M travels in a state in which an inter-vehicle distance between the host vehicle M and a preceding traveling vehicle is kept constant on the basis of the information input from the camera 51, the radar device 52, and the finder 53 via the object recognition device 54. That is to say, the driving assistance control unit 200 performs acceleration/deceleration control (speed control) based on the inter-vehicle distance between the host vehicle M and the preceding traveling vehicle. Furthermore, the driving assistance control unit 200 controls, when performing LKAS, the steering device 520 so that the host vehicle M travels while maintaining (performing lane keeping) the traveling lane in which the host vehicle M is currently traveling. That is to say, the driving assistance control unit 200 performs steering control for maintaining the lane. The type of driving assistance of the first degree may include various controls other than automatic driving (the second degree and the third degree) which do not require a manipulation on the driving manipulator 80.

The automatic driving control unit 300 performs the second degree and the third degree of driving assistance. The automatic driving control unit 300 includes, for example, a first control unit 310 and a second control unit 350. The first control unit 310 and the second control unit 350 are realized through, for example, a program (software) executed by a hardware processor such as a CPU. Furthermore, some or all of these constituent elements may be realized through hardware such as an LSI, an ASIC, an FPGA, and a GNU or may be realized through software and hardware which cooperate together.

The first control unit 310 includes, for example, a recognition unit 320 and the action plan generation unit 330. The first control unit 310, for example, realizes a function by an artificial intelligence (AI) and a function by a model provided in advance in parallel. For example, a function for "recognizing an intersection" may be realized by performing recognition of intersection through deep learning or the like and recognition based on conditions provided in advance (signals in which pattern matching is possible, road marking lines, and the like) in parallel, scoring both of the recognitions, and comprehensively evaluating the scored recognitions. Thus, the reliability of automatic driving is guaranteed.

The recognition unit 320 recognizes states such as a position, a speed, and an acceleration of the peripheral vehicles on the basis of the information input from the camera 51, the radar device 52, and the finder 53 via the object recognition device 54. The position of the peripheral vehicles is recognized as, for example, a position on absolute coordinates with a representative point (the center of gravity, the center of drive axis, or the like) of the host vehicle M as an origin and is used for control. The position of the peripheral vehicle may be represented by a representative point such as the center of gravity or a corner of the peripheral vehicle or may be represented by a represented region. A "state" of the peripheral vehicle may include the acceleration or jerk of an object or a "behavioral state" (for example, whether the vehicle is changing lane or is about to change lane).

Also, the recognition unit 320 recognizes, for example, a lane (a traveling lane) in which the host vehicle M is traveling. For example, the recognition unit 320 recognizes a traveling lane by comparing a road marking line pattern obtained from the second map information 72 (for example, an array of solid lines and broken lines) with a road marking line pattern in the periphery of the host vehicle M recognized from an image captured by the camera 51. The recognition unit 320 may recognize a traveling lane by recognizing not only a road marking line but also a traveling road boundary (a road boundary) including a road marking line, a road shoulder, a curb, a median strip, a guardrail, and the like. In this recognition, the position of the host vehicle M acquired from the navigation device 60 or the processing result by means of the INS may be added. In addition, the recognition unit 320 recognizes a stop line, an obstacle, a red light, a tollhouse, other road events, and the like.

The recognition unit 320 recognizes, when recognizing a traveling lane, a position and a posture of the host vehicle M with respect to the traveling lane.

Figure 2:
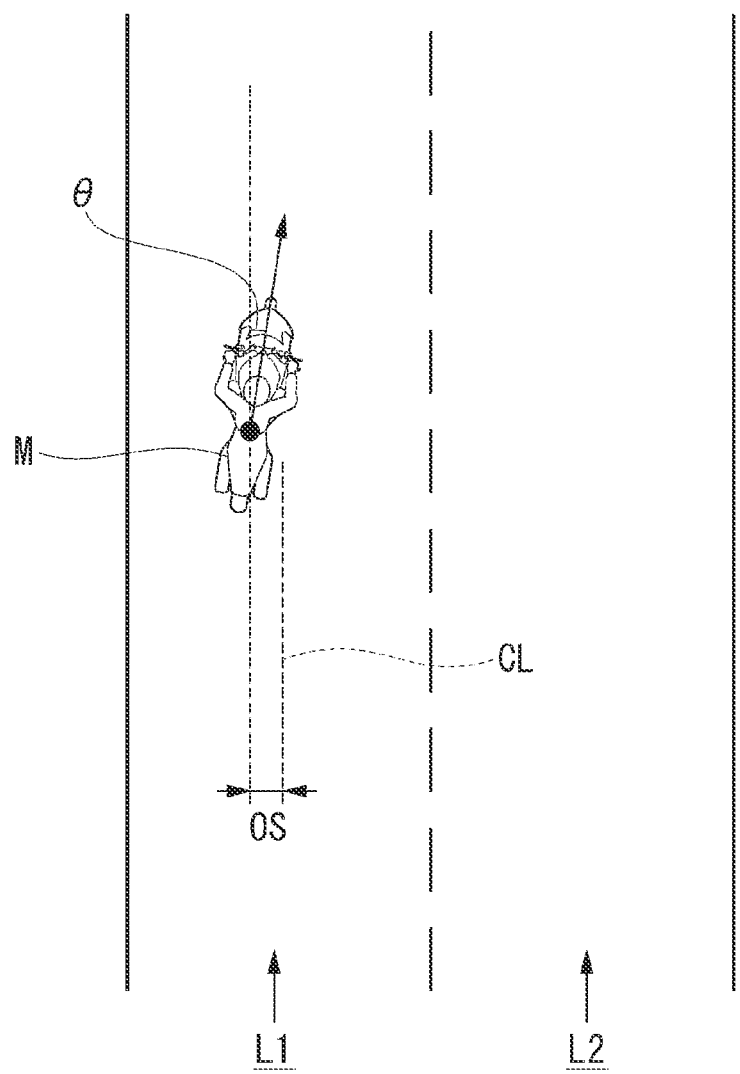
FIG. 2 is a diagram showing a state in which a host vehicle position recognition unit recognizes a relative position and a posture of a host vehicle with respect to a traveling lane.

FIG. 2 is a diagram showing an example of a state in which the recognition unit recognizes a relative position and posture of the host vehicle with respect to the traveling lane.

As shown in FIG. 2, for example, the recognition unit 320 may recognize a deviation OS of a reference point (for example, the center of gravity) of the host vehicle M from a center CL of the traveling lane and an angle $\theta$ of a direction of travel of the host vehicle M relative to a line connecting the center CL of the traveling lane, as a relative position and posture of the host vehicle M with respect to a traveling lane L1. Alternatively, the recognition unit 320 may recognize a position or the like of a reference point of the host vehicle M with respect to any side end portion (a road marking line or a road boundary) of the traveling lane L1, as a relative position of the host vehicle M with respect to the traveling lane.

As shown in FIG. 1, the action plan generation unit 330 generates an action plan in which the host vehicle M is caused to travel based on automatic driving. In principle, the action plan generation unit 330 travels in a recommendation lane determined by means of the recommendation lane determination unit 71 and generates a target track in which the host vehicle M automatically travels in the future (regardless of the driver's manipulation) so that the host vehicle M can respond to the surrounding conditions thereof. The target track includes, for example, a position element used for determining a position of the host vehicle M in the future and a speed element used for determining a speed, acceleration, or the like of the host vehicle M in the future. For example, the action plan generation unit 330 determines a plurality of points (track points) at which the host vehicle M needs to arrive in order as position elements of the target track. The track points are points at which the host vehicle M needs to arrive for each prescribed traveling distance (for example, about several [m]). The prescribed traveling distance may be calculated, for example, using a road distance when the vehicle moves along the route. Furthermore, the action plan generation unit 330 determines a target speed and target acceleration for each prescribed sampling time (for example, about several tenths of a second) as a speed element of the target track. In addition, the track points may be positions at which the host vehicle M needs to arrive, for each prescribed sampling time, at the sampling time. In this case, the target speed and the target acceleration are determined in accordance with the sampling time and an interval between the track points.

The action plan generation unit 330 may set an event for automatic driving at the time of generating a target track. Examples of the event for automatic driving include a constant speed traveling event in which the host vehicle M travels in the same lane at a constant speed, a follow-up traveling event in which the host vehicle M travels to follow up a preceding traveling vehicle, a lane change event in which the host vehicle M changes a traveling lane, a branching event in which the host vehicle M travels in a target direction at a branch point on a road, a merging event in which the host vehicle M merges at a merging point, an overtaking event in which the host vehicle M overtakes a preceding traveling vehicle, and the like. The action plan generation unit 330 generates a target track according to a started-up event.

Figure 3:
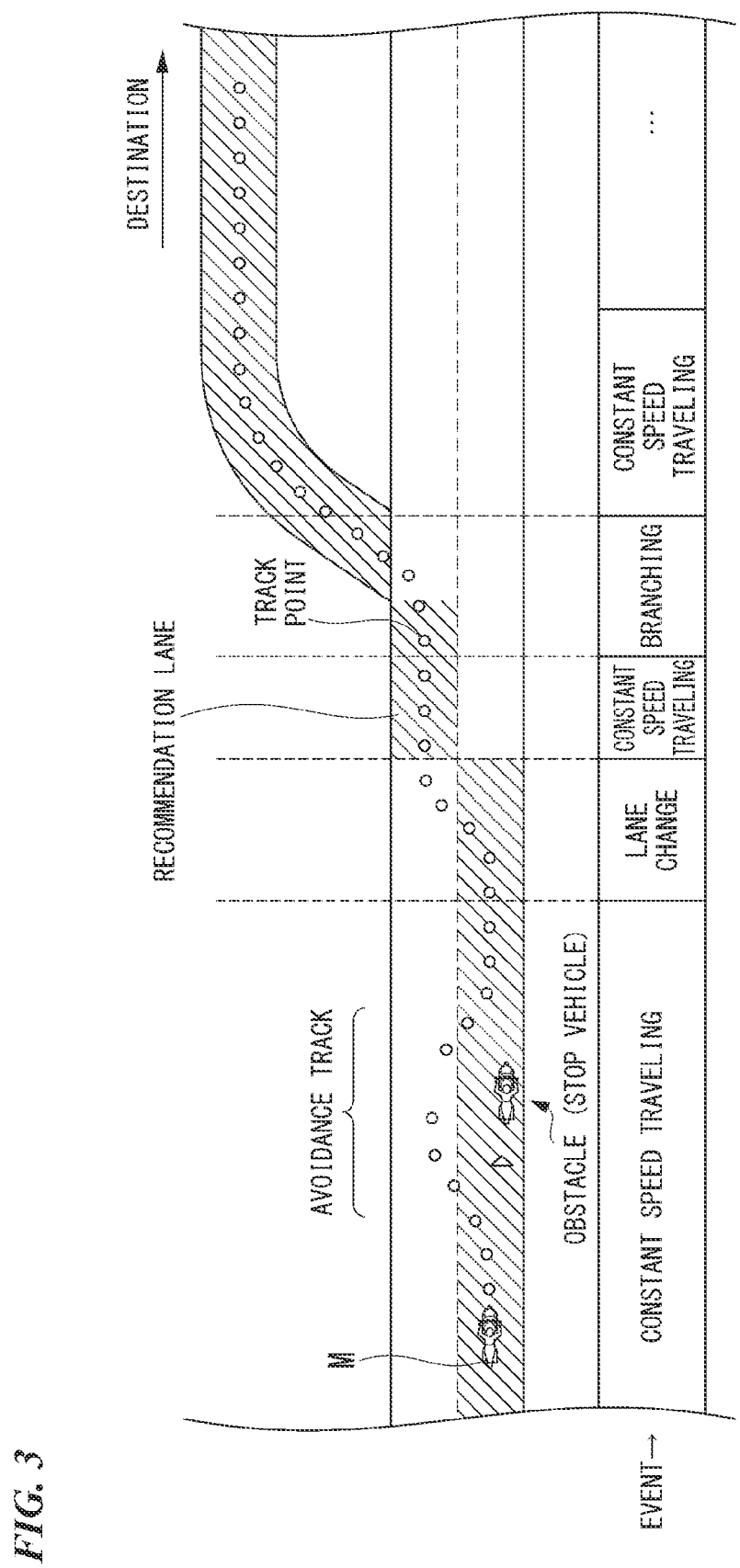
FIG. 3 is a diagram showing a state in which a target track is generated on the basis of a recommendation lane.

FIG. 3 is a diagram showing a state in which a target track is generated on the basis of a recommendation lane.

As shown in FIG. 3, a recommendation lane is set so that good conditions in which the host vehicle M travels along a route to a destination is provided. The action plan generation unit 330 starts-up the lane change event, the branching event, the merging event, or the like when the host vehicle M approaches a prescribed distance before a switching point of a recommendation lane (may be determined in accordance with a type of event). When it becomes necessary to avoid an obstacle during the execution of each event, an avoidance track is generated as shown in the drawings.

Referring to FIG. 1 again, the second control unit 350 controls the traveling driving force output device 500, the braking device 510, and the steering device 520 so that the host vehicle M passes along the target track generated by means of the action plan generation unit 330 at a scheduled time.

The second control unit 350 includes, for example, an acquisition unit 352, a speed control unit 354, and a steering control unit 356. The acquisition unit 352 acquires information concerning the target track (the track point) generated by means of the action plan generation unit 330 and stores the information in a memory (not shown). The speed control unit 354 controls the traveling driving force output device 500 or the braking device 510 on the basis of the speed element associated with the target track stored in the memory. The steering control unit 356 controls the steering device 520 in accordance with a degree of bending of the target track stored in the memory. The processing of the speed control unit 354 and the steering control unit 356 is realized through, for example, feed forward control and feedback control which are combined. As an example, the steering control unit 356 is performed through a combination of feed forward control according to a curvature of a road in front of the host vehicle M and feedback control based on a deviation from the target track.

The traveling driving force output device 500 outputs a traveling driving force (torque) used for traveling the host vehicle M to a drive wheel. The traveling driving force output device 500 includes, for example, a combination of an internal combustion engine, an electric motor, a transmission, and the like and an electronic control unit (ECU) configured to control these. The ECU controls the above constitution in accordance with the information input from the second control unit 350 and the information input from the driving manipulator 80.

The braking device 510 includes, for example, a brake caliper, a cylinder configured to transmit hydraulic pressure to the brake caliper, an electric motor configured to generate hydraulic pressure in the cylinder, and a brake ECU. The brake ECU controls the electric motor in accordance with the information input from the second control unit 350 or the information input from the driving manipulator 80 so that the brake torque corresponding to the braking manipulation is output to each wheel. The braking device 510 may include, as a backup, a mechanism for transmitting the hydraulic pressure generated due to the manipulation of the brake lever or the brake pedal included in the driving manipulator 80 to the cylinder via a master cylinder. The braking device 510 is not limited to the constitution described above and may be an electronically controlled hydraulic pressure braking device which controls an actuator in accordance with the information input from the second control unit 350 and transmits the hydraulic pressure of the master cylinder to the cylinder.

The steering device 520 includes, for example, a steering ECU and an electric motor. The electric motor, for example, changes a direction of the steering wheel (a front wheel). The steering ECU drives the electric motor in accordance with the information input from the second control unit 350 or the information input from the driving manipulator 80 to change a direction of the steering wheel.

<Whole Vehicle>

A structure of a saddle-riding type vehicle having the driving assistance system 1 in the embodiment installed therein will be described below. Unless otherwise stated, directions such as a forward direction, a rearward direction, a leftward, and a rightward in the following description are the same directions in a vehicle which will be described later. Furthermore, at appropriate points in the drawings used in the following description, an arrow FR indicating a forward side of the vehicle, an arrow LH indicating a leftward side of the vehicle, and an arrow UP indicating an upward side of the vehicle are shown.

Figure 4:
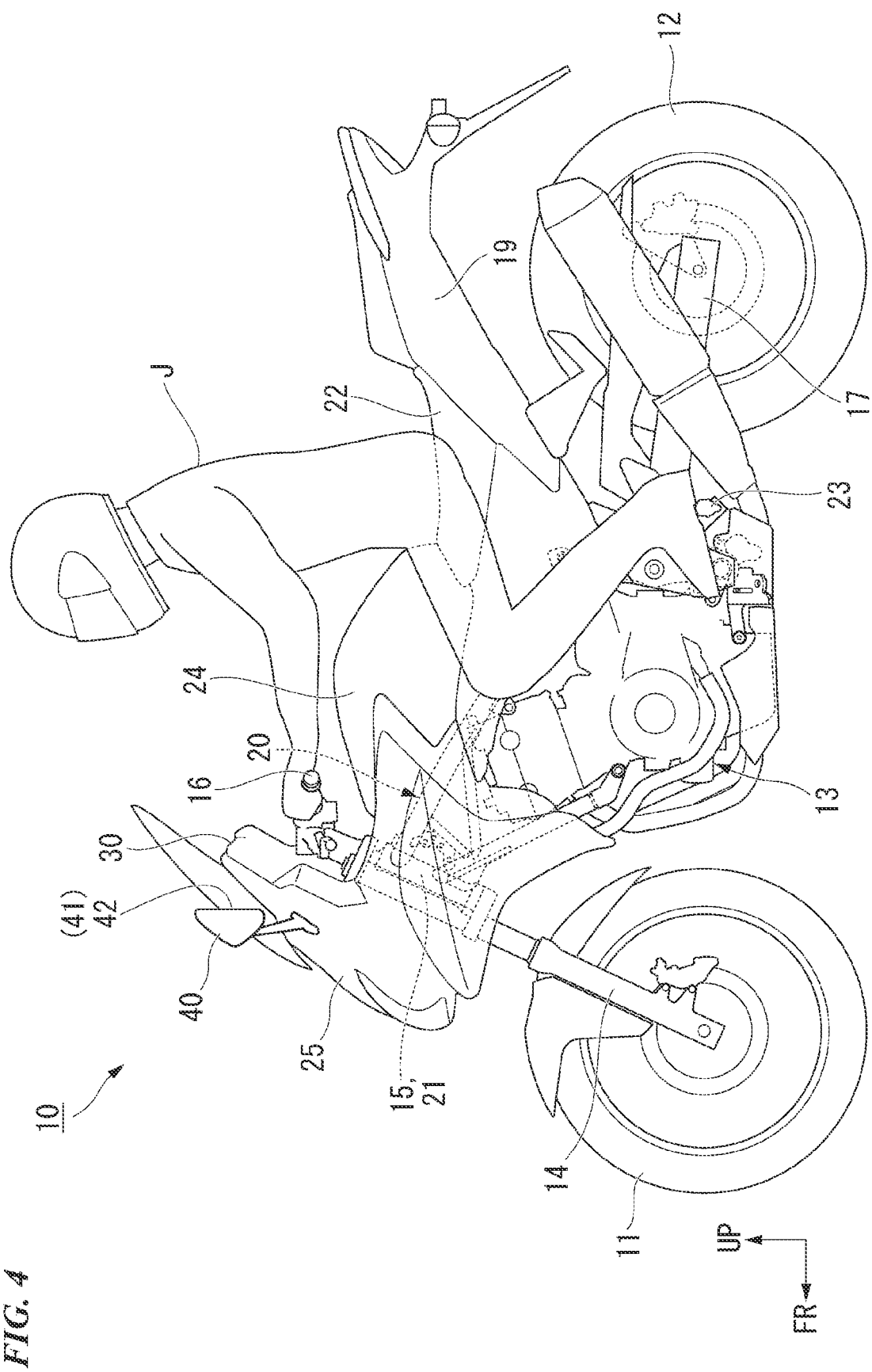
FIG. 4 is a left side view of a motorcycle in the first embodiment.

FIG. 4 is a left side view of a motorcycle in the first embodiment.

As shown in FIG. 4, a motorcycle 10 is a saddle-riding type vehicle having the driving assistance system 1 in the embodiment installed therein. The motorcycle 10 mainly includes a front wheel 11 which is a steering wheel, a rear wheel 12 which is a drive wheel, a vehicle body frame 20 configured to support a motor 13 (an engine in the illustrated example), and a pair of side mirrors 40.

The front wheel 11 is supported by the vehicle body frame 20 via a steering mechanism in a steerable manner. The steering mechanism includes a front fork 14 configured to support the front wheel 11 and a steering stem 15 configured to support the front fork 14. A steering handle 16 held by the driver J is attached to an upper portion of the steering stem 15. The front wheel 11 is braked using the braking device 510.

The rear wheel 12 is supported by a rear end portion of a swing arm 17 extending in a forward/rearward direction at the rear portion of the vehicle. A front end portion of the swing arm 17 is supported by the vehicle body frame 20 to be able to swing upward and downward. The rear wheel 12 is braked using the braking device 510.

The vehicle body frame 20 rotatably supports the steering stem 15 using a head pipe 21 provided at the front end portion. The vehicle body frame 20 supports a seat 22 on which the driver J sits, left and right steps 23 on which the driver J puts his/her feet, a fuel tank 24 disposed in front of the seat 22, and the like, in addition to the motor 13 described above. A front cowl 25 supported by the vehicle body frame 20 is installed on the front portion of the vehicle. A meter device 30 is disposed inside the front cowl 25.

The pair of side mirrors 40 are provided on the front portion of the vehicle. The pair of side mirrors 40 are provided on both the left and right sides of the vehicle body width center line. The pair of side mirrors 40 are attached to the front cowl 25. The pair of side mirrors 40 are disposed with a mirror surface 41 facing rearward. An attachment place of each of the side mirrors 40 is not limited to the front cowl 25 and may be, for example, the steering handle 16 or the like. The pair of side mirrors 40 are formed symmetrically with each other. Hereinafter, when distinguishing between the right side mirror 40 and the left side mirror 40 is not required, they are simply referred to as a side mirror 40.

Figure 5:
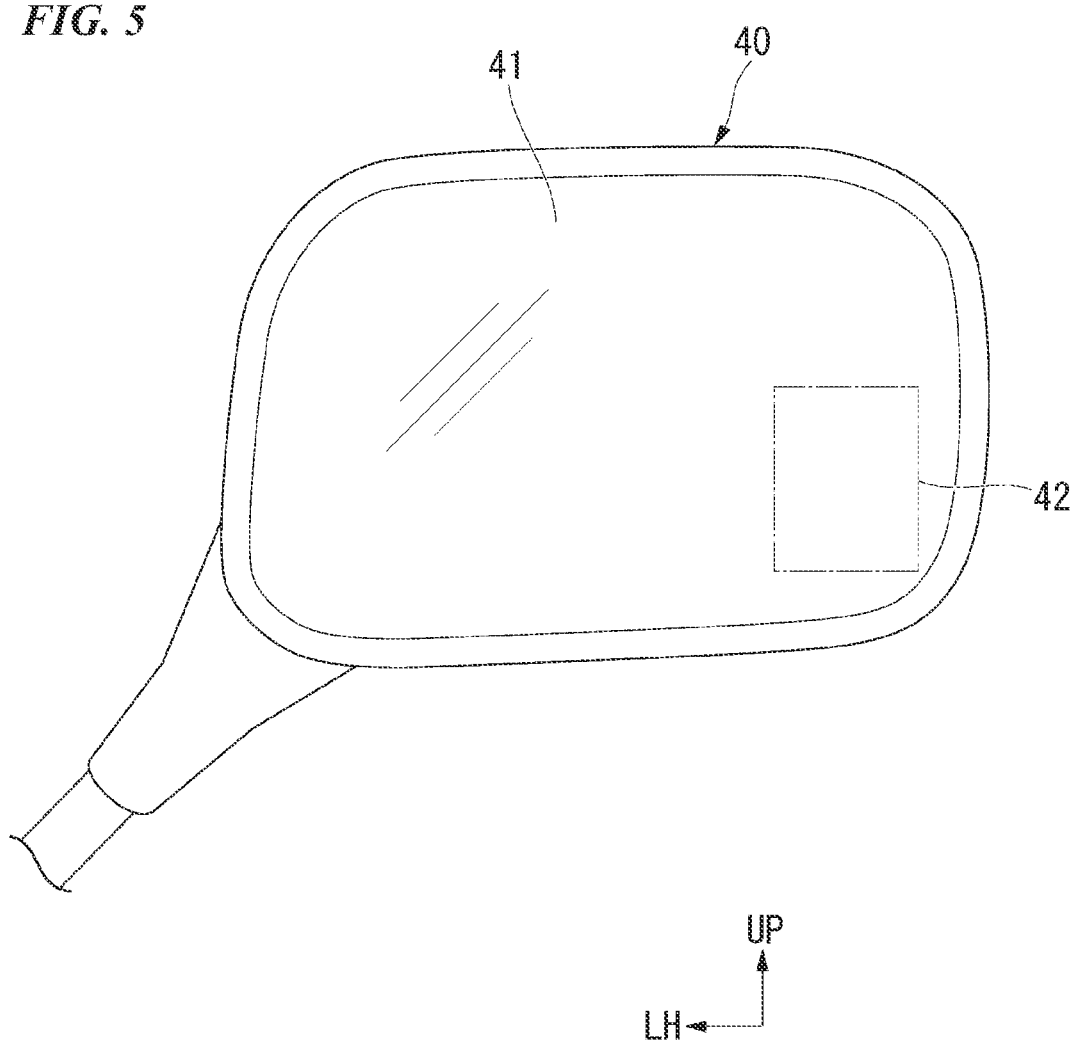
FIG. 5 is a front view of a side mirror on a right side in the first embodiment.

FIG. 5 is a front view of a side mirror on a right side in the first embodiment. As shown in FIG. 5, the indicator 42 (a display unit) is incorporated in part of the mirror surface 41 of the side mirror 40. The indicator 42 notifies the driver J of the existence of an object in the periphery of the host vehicle M. The indicator 42 is formed of, for example, a light emitting element such as a light emitting diode (LED). The indicator 42 displays a preset sign by causing light of the light emitting element to transmit through the mirror surface 41 of the side mirror 40. The indicator 42 is connected to the notification control unit 160. The indicator 42 display a notification directed to the driver J on the mirror surface 41 of the side mirror 40 in accordance with a display command transmitted from the notification control unit 160. A display form of the notification will be described later.

<Function of Notification Control Unit>

A function of the notification control unit 160 according to the embodiment will be described below with reference to FIGS. 6 to 10. This processing flow is repeatedly performed at least in a state in which a driver is obliged to monitor the surrounding. That is to say, this processing flow is performed in a state in which the driving assistance is not performed (a manual driving state) or in a state in which the driving assistance of the first degree or the second degree is performed.

Figure 6:
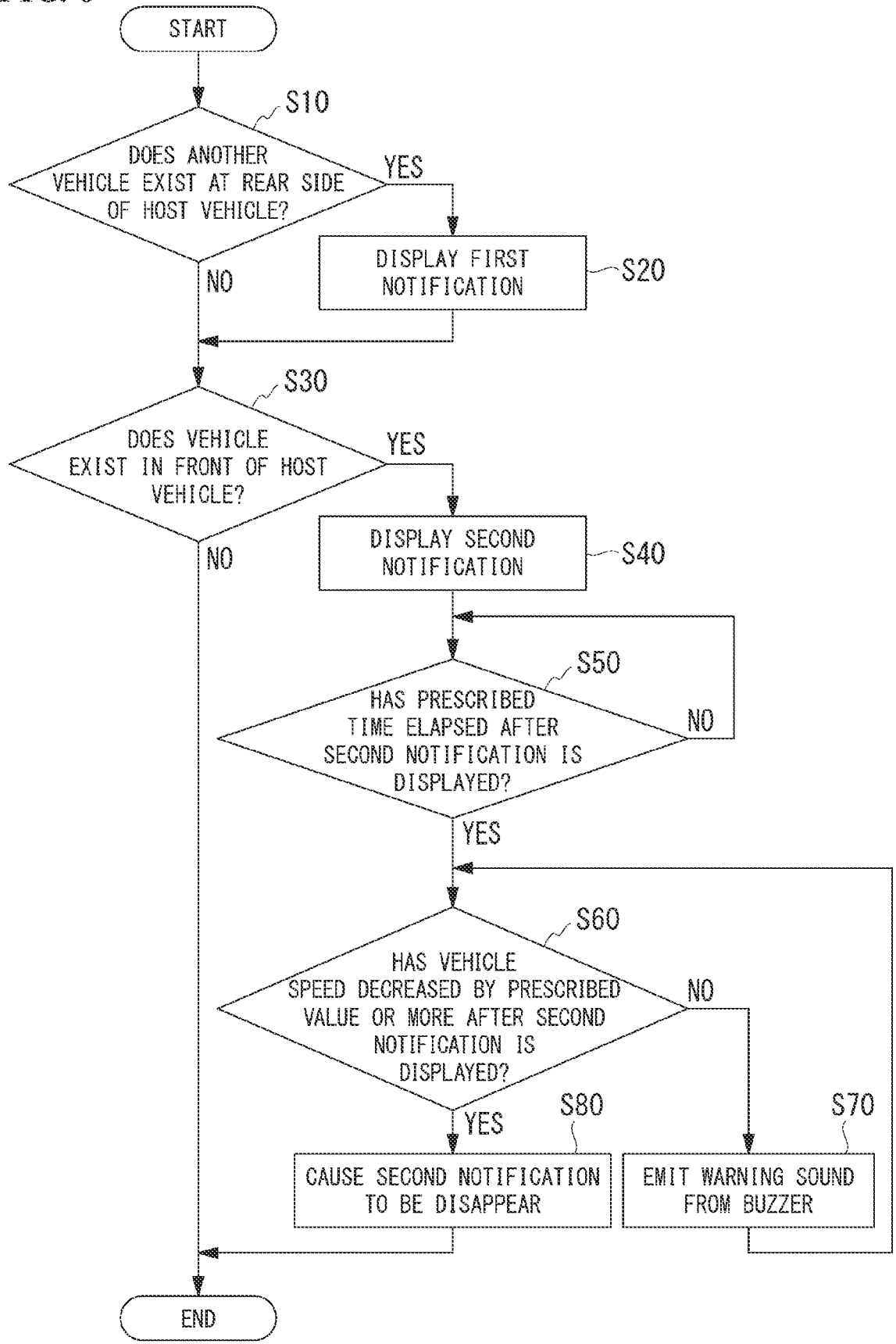
FIG. 6 is a diagram showing a scene in which another vehicle exists at the rear side of the host vehicle.
Figure 7:
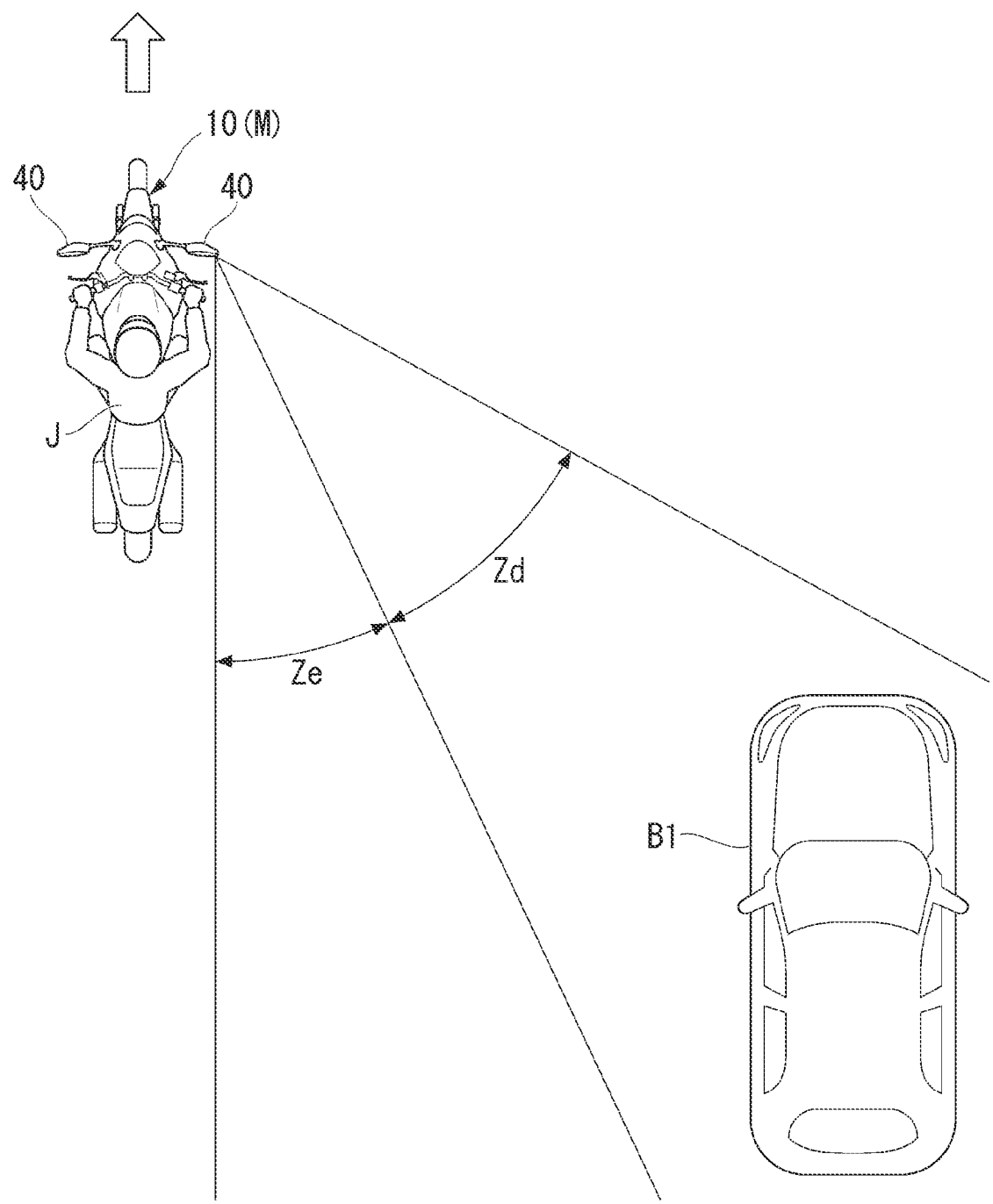
FIG. 7 is a diagram showing a scene in which another vehicle exists at the rear side and in front of the host vehicle.
Figure 8:
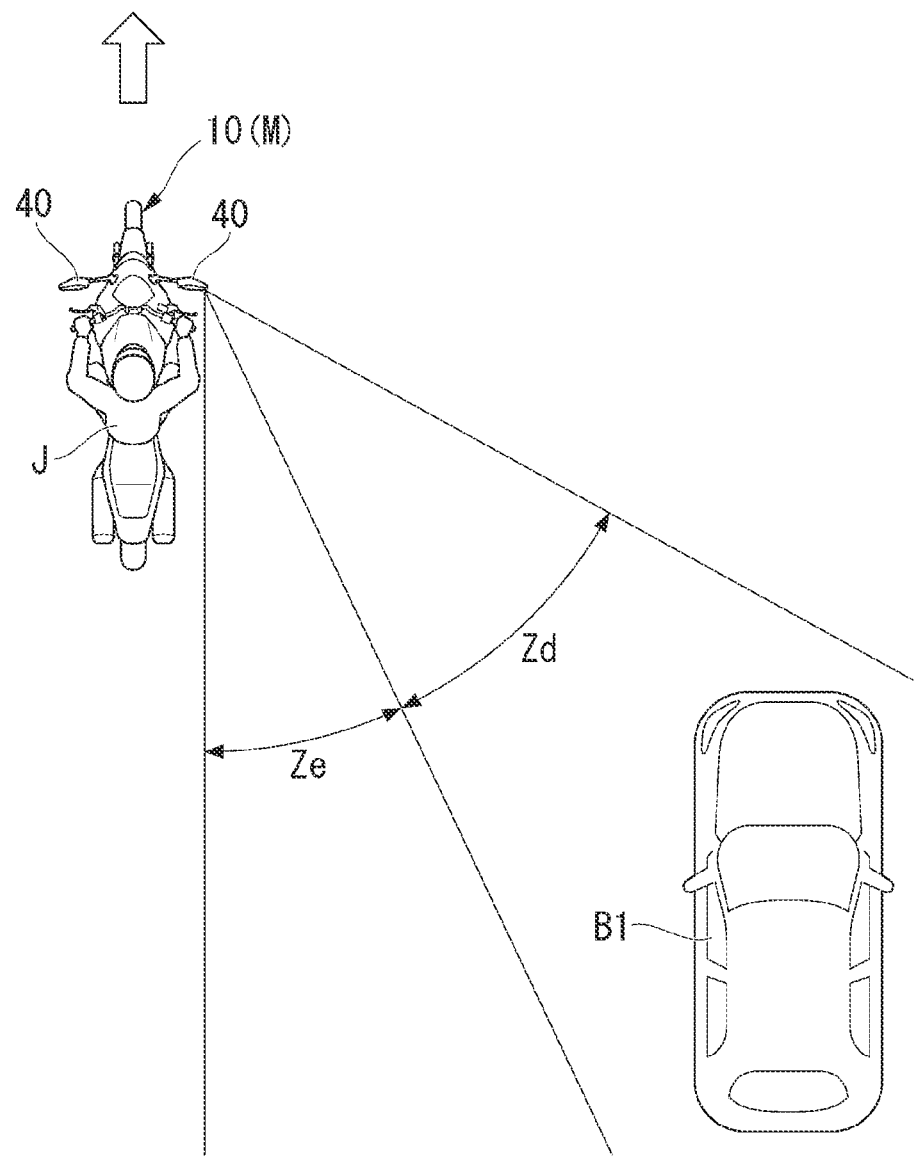
FIG. 8 is a diagram showing a scene in which another vehicle exists at the rear side and in front of the host vehicle.
Figure 9:
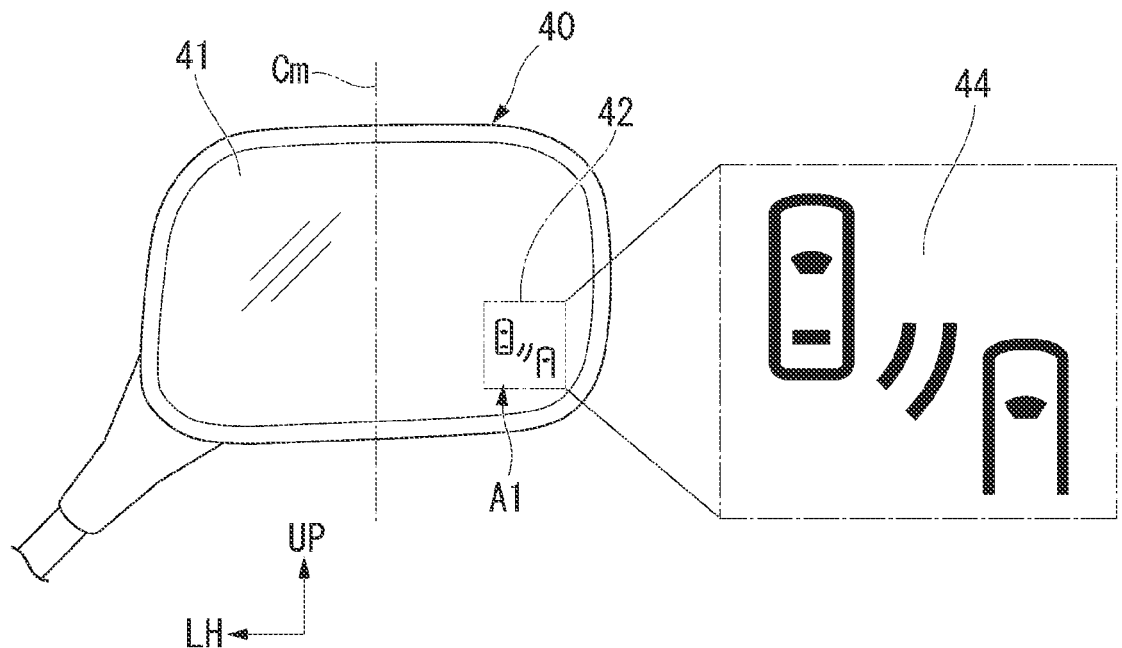
FIG. 9 is a diagram showing a first notification in the first embodiment.
Figure 10:
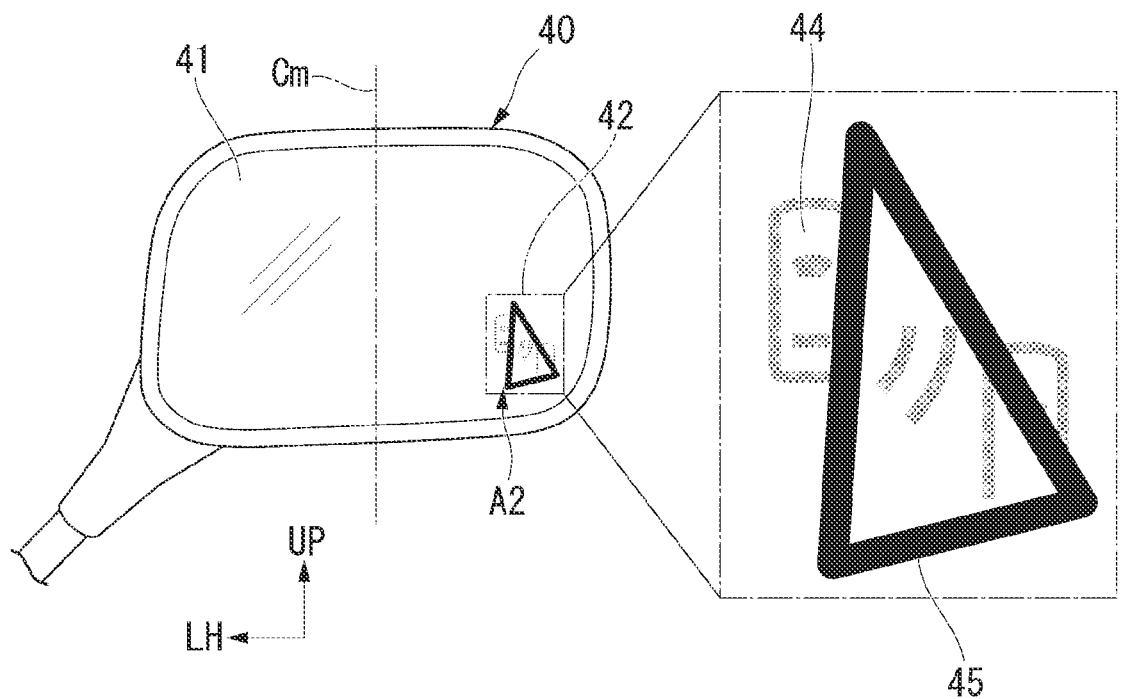
FIG. 10 is a diagram showing a second notification in the first embodiment.

FIG. 6 is a flowchart for describing a processing flow using the notification control unit. FIG. 7 is a diagram showing a scene in which another vehicle exists at the rear side of a host vehicle. FIG. 8 is a diagram showing a scene in which another vehicle exists at the rear side and in front of the host vehicle. FIG. 9 is a diagram showing a first notification in the first embodiment and is a rear view of the side mirror having the first notification displayed thereon. FIG. 10 is a diagram showing a second notification in the first embodiment and is a rear view of the side mirror having the second notification displayed thereon.

As shown in FIG. 6, in Step S10, the notification control unit 160 determines whether another vehicle B1 exists at the rear side of the host vehicle M. To be specific, as shown in FIG. 7, the notification control unit 160 determines the existence of another vehicle B1 located in a blind spot region Zd which is a blind spot of the side mirror 40 or another vehicle B1 which is predicted to enter the blind spot region Zd. In FIG. 7, reference symbol Zv indicates a region visible to the driver J through the side mirror 40 (the same applies to FIG. 8). When it is determined that the other vehicle B1 exists at the rear side of the host vehicle M (S10: YES), the notification control unit 160 proceeds to the process of Step S20. When it is determined that the other vehicle B1 does not exist at the rear side of the host vehicle M (S10: NO), the notification control unit 160 proceeds to the process of Step S30.

In Step S20, the notification control unit 160 controls the indicator 42 so that a first notification A1 is displayed on the side mirror 40 on a side on which the other vehicle B1 exists. When the other vehicle B1 is on the rear right side, as shown in FIG. 9, the first notification A1 is displayed on the mirror surface 41 of the side mirror 40 on the right side. The first notification A1 is displayed in a place of the mirror surface 41 of the side mirror 40 further outside in a vehicle width direction than an intermediate portion Cm in the vehicle width direction. For example, the first notification A1 is composed of a first sign 44 indicating a positional relationship between the host vehicle M and the other vehicle B1. Subsequently, the notification control unit 160 proceeds to the process of Step S30.

Referring to FIG. 6 again, in Step S30, the notification control unit 160 determines whether another vehicle B2 exists in front of the host vehicle M. To be specific, as shown in FIG. 8, the notification control unit 160 determines the existence of the other vehicle B2 in a path of the host vehicle M. When it is determined that the other vehicle B2 exists in front of the host vehicle M (S30: YES), the notification control unit 160 proceeds to the process of Step S40. When it is determined that the other vehicle B2 does not exist in front of the host vehicle M (S30: NO), the notification control unit 160 ends a series of processes.

In Step S40, the notification control unit 160 controls the indicator 42 so that a second notification A2 is displayed on the side mirror 40 having the first notification A1 displayed thereon. As shown in FIG. 10, the second notification A2 is composed of a second sign 45 in which the line of sight is caused to be moved forward and the first sign 44 which overlap. That is to say, the second notification A2 is displayed in a place of the mirror surface 41 of the side mirror 40 further outside in the vehicle width direction than the intermediate portion Cm in the vehicle width direction. In the illustrated example, the second sign 45 has a triangular shape in which the second sign 45 is directed upward. The shape of the second sign 45 is not limited thereto and may be, for example, an arrow, a character, or the like.

The notification control unit 160 may decrease, at the time of displaying the second notification A2, the brightness of the first sign 44 as compared with the case of displaying the first notification A1. The notification control unit 160 may change a display mode for the second notification A2 in accordance with parameters such as a vehicle speed of the host vehicle M, a distance between the host vehicle M and the other vehicle B2 in front of the host vehicle M, and a rate of change in the distance between the host vehicle M and the other vehicle B2 in front of the host vehicle M. For example, the notification control unit 160 may blink or flicker the second sign 45. "Blinking" is to repeat a turned-on state with a constant brightness and a turned-off state. "Flickering" is to repeat a turned-on state and a turned-off state while changing the brightness. In this case, the notification control unit 160 changes a blinking cycle or a flickering cycle of the second sign 45 in accordance with the parameters. The notification control unit 160 shortens the blinking cycle or the flickering cycle of the second sign 45 when a degree of danger to the host vehicle M increases. For example, the notification control unit 160 changes the brightness of the second sign 45 in accordance with the parameters. The notification control unit 160 increases the brightness of the second sign 45 when the degree of danger to the host vehicle M increases. Subsequently, the notification control unit 160 proceeds to the process of Step S50.

Referring to FIG. 6 again, in Step S50, the notification control unit 160 determines whether a prescribed time has elapsed after the second notification A2 has been displayed. The prescribed time may be fixedly set or may be determined in accordance with the degree of danger to the host vehicle M. When it is determined that the prescribed time has not elapsed after the second notification A2 has been displayed (S50: NO), the notification control unit 160 repeatedly performs the process of Step S50. When it is determined that the prescribed time has elapsed after the second notification A2 has been displayed (S50: YES), the notification control unit 160 proceeds to the process of Step S60.

In Step S60, the notification control unit 160 determines whether a vehicle speed of the host vehicle M has decreased by a prescribed value or more after the second notification A2 has been displayed. The prescribed time may be fixedly set or may be determined in accordance with the degree of danger to the host vehicle M. When the vehicle speed of the host vehicle M has not decreased by the prescribed value or more, the driver J is likely not to recognize the other vehicle B2 in front of the host vehicle M in some cases. When it is determined that the vehicle speed of the host vehicle M has not decreased by the prescribed value or more after the second notification A2 has been displayed (S60: NO), the notification control unit 160 proceeds to the process of Step S70. When it is determined that the vehicle speed of the host vehicle M has decreased by the prescribed value or more after the second notification A2 has been displayed (S60: YES), the notification control unit 160 proceeds to the process of Step S80.

In Step S70, the notification control unit 160 controls a speaker or a buzzer of the HMI 56 so that a warning sound is emitted. Furthermore, the notification control unit 160 may control a device worn by the driver J such as a helmet via the communication device 55 and output display or a warning sound. The notification control unit 160 may change a warning sound in accordance with the parameters such as the vehicle speed of the host vehicle M, the distance between the host vehicle M and the other vehicle B2 in front of the host vehicle M, and the rate of change in the distance between the host vehicle M and the other vehicle B2 in front of the host vehicle M. For example, the notification control unit 160 changes a volume of the warning sound in accordance with the parameters. The notification control unit 160 increases the volume of the warning sound when the degree of danger to the host vehicle M increases. Subsequently, the notification control unit 160 proceeds to the process of Step S60 again.

In Step S80, the notification control unit 160 controls the indicator 42 so that the second notification A2 displayed on the side mirror 40 is disappear. In addition, the notification control unit 160 ends a series of processes.

In this way, the notification control unit 160 controls the indicator 42 so that the first notification A1 is displayed when the other vehicle B1 is at the rear side of the host vehicle M. Furthermore, the notification control unit 160 controls the indicator 42 so that the second notification A2 different from the first notification A1 is displayed when the other vehicle B1 is at the rear side of the host vehicle M and the other vehicle B2 is in front of the host vehicle M.

As described above, the motorcycle 10 in the embodiment includes the object recognition device 54 configured to recognize an object in front of the host vehicle M and an object at the rear side of the host vehicle M, the indicator 42 configured to notify the driver J of the existence of an object in the periphery of the host vehicle M, and the notification control unit 160 configured to control the indicator 42 by determining the existence of the object in front of the host vehicle M and the existence of the object at the rear side of the host vehicle M on the basis of the recognition result of the object recognition device 54. The notification control unit 160 controls the indicator 42 so that the first notification A1 is displayed when it is determined that there is the object at the rear side of the host vehicle M, and controls the indicator 42 so that the second notification A2 different from the first notification A1 is displayed when it is determined that there is the object at the rear side of the host vehicle M and there is the object in front of the host vehicle M.

According to the constitution, it is possible to change the display mode of the indicator 42 in accordance with the existence of the object in front of the host vehicle M. For this reason, when the driver J is looking at the first notification A1 displayed by the indicator 42, the driver J can recognize that the object exists in front of the host vehicle M by displaying the second notification A2 different from the first notification A1. Therefore, even when the driver J is looking to the side, the driver J can recognize the object existing in front of the vehicle.

Also, the notification control unit 160 changes the display mode of the second notification A2 in accordance with the vehicle speed of the host vehicle M.

Here, when the vehicle speed of the host vehicle M increases, the host vehicle M more easily approaches the object in front of the host vehicle M. Thus, the degree of danger to the host vehicle M increases. With the above constitution, it is possible to change the display mode of the second notification A2 in accordance with the magnitude of the degree of danger to the host vehicle M. Therefore, the driver J can more reliably recognize the existence of the object in front of the vehicle.

Also, the motorcycle 10 includes the HMI 56 including a speaker or a buzzer which emits a warning sound. The notification control unit 160 controls the HMI 56 so that a warning sound is emitted when the vehicle speed has not decreased by the prescribed value or more until a prescribed time has elapsed after the second notification A2 has been displayed.

Here, when the vehicle speed has not decreased by the prescribed value or more until the prescribed time has elapsed after the second notification A2 has been displayed, the driver J is likely not to recognize an object in front of the host vehicle M in some cases. That is to say, the driver J is likely not to look at the second notification A2 in some cases. With the above constitution, it is possible to notify the driver J of the existence of an object in front of the host vehicle M using a warning sound. Therefore, the driver J can more reliably recognize the existence of an object in front of the vehicle.

Figure 11:
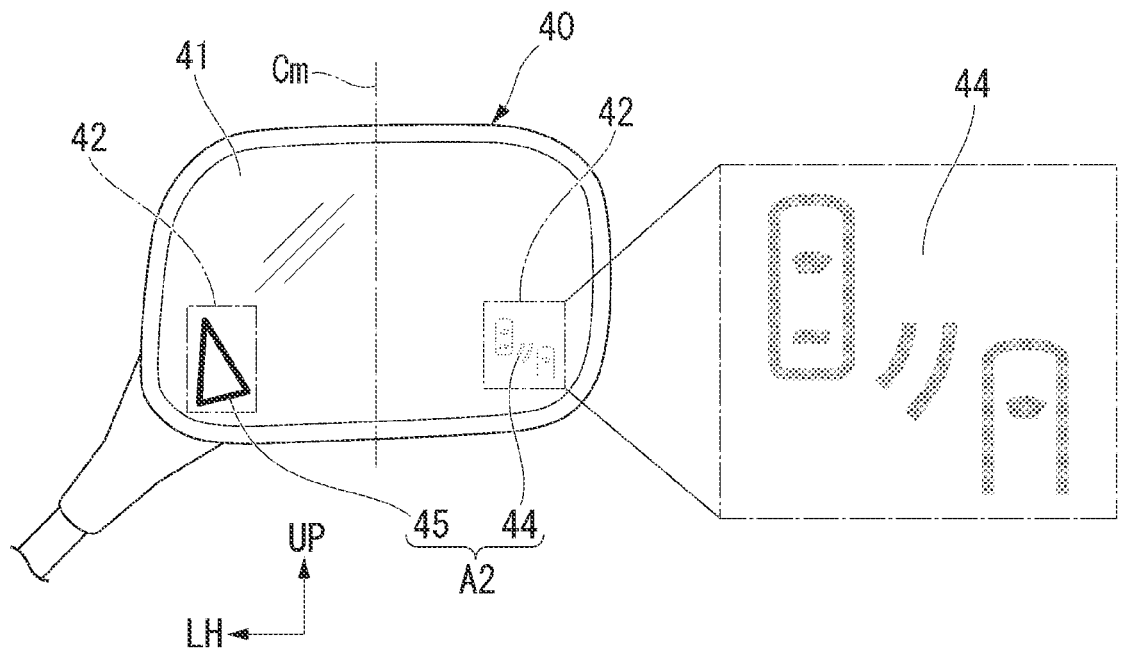
FIG. 11 is a diagram showing a second notification in a second embodiment.
Figure 12:
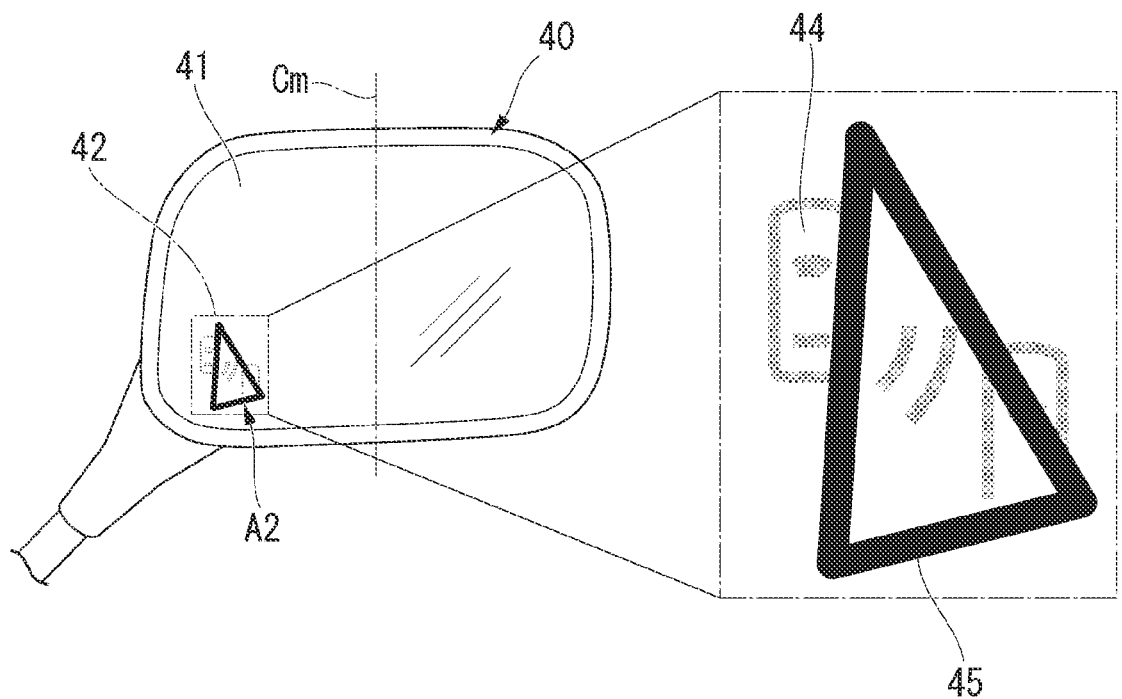
FIG. 12 is a diagram showing a second notification in a third embodiment.

Although the indicator 42 displays the second notification A2 on a place of the mirror surface 41 of the side mirror 40 further outside in the vehicle width direction than the intermediate portion Cm in the vehicle width direction in the first embodiment, the present invention is not limited thereto. For example, as shown in FIG. 11, the second sign 45 constituting the second notification A2 may be displayed at a position of the mirror surface 41 of the side mirror 40 further inside in the vehicle width direction than the intermediate portion Cm in the vehicle width direction. In this case, the first sign 44 in the first notification A1 and the first sign 44 in the second notification A2 may be displayed, as shown in FIG. 11, at the place of the mirror surface 41 of the side mirror 40 further outside in the vehicle width direction than the intermediate portion Cm in the vehicle width direction or may be displayed, as shown in FIG. 12, at the place of the mirror surface 41 of the side mirror 40 further inside in the vehicle width direction. That is to say, at least part of the second notification A2 is displayed at the place of the mirror surface 41 of the side mirror 40 further inside in the vehicle width direction than the intermediate portion Cm in the vehicle width direction.

According to the constitution, for example, when the driver J is looking at the vicinity of an outer end portion of the mirror surface 41 of the side mirror 40 in the vehicle width direction, at least part of the second notification A2 is displayed on a position closer to a center side of the vehicle in a vehicle width than the line-of-sight direction of the driver J. For this reason, the second notification A2 is displayed at a place in which the line of sight of the driver J can easily pass. Therefore, the driver J can more reliably recognize the existence of an object in front of the vehicle.

The present invention is not limited to the above-described embodiment described with reference to the drawings and various modified examples are conceivable within the scope thereof.

For example, although the application of the driving assistance system 1 to the motorcycle has been described as an example in the above embodiment, the present invention is not limited thereto. Saddle-riding type vehicles to which the driving assistance system 1 is applied include all vehicles in which a driver straddles a vehicle body and include not only motorcycles but also three-wheeled vehicles (front two-wheeled and rear one-wheeled vehicles in addition to front one-wheeled and rear two-wheeled vehicles).

Although the driving assistance system 1 in the above embodiment can perform so-called automatic driving, the present invention is not limited thereto. That is to say, the present invention may be applied to a vehicle in which a driver's manipulation is required at all time at the time of traveling.

Also, although the object recognition device 54 recognizes a position of an object in the periphery of the host vehicle M on the basis of the detection results of the camera 51, the radar device 52, and the finder 53 in the above embodiment, the present invention is not limited thereto. For example, the object recognition device 54 may recognize the existence of another vehicle existing in the vicinity of the host vehicle M by means of V2X communication (for example, vehicle-to-vehicle communication, road-to-vehicle communication, or the like) using the communication device 55.

Furthermore, although the indicator 42 is incorporated in the mirror surface 41 of the side mirror 40 in the above embodiment, the present invention is not limited thereto. The indicator 42 may be incorporated in a member provided separately from the side mirror 40.

In addition, the side mirror 40 may be a so-called smart rearview mirror which displays a video photographed by means of a camera. In this case, a display device such as a liquid crystal display which constitutes a display surface of a side mirror may function as an indicator.

Although the notification control unit 160 determines in the process of Step S50 whether the driver J recognizes another vehicle in front of the host vehicle M due to a decrease in vehicle speed of the host vehicle M in the above embodiment, the present invention is not limited thereto. In addition, a determination concerning whether the driver J recognizes another vehicle in front of the host vehicle M based on the line-of-sight direction of the driver J recognized by means of the occupant state monitoring unit 150.

Although the front object recognition unit which recognizes an object in front of the host vehicle M and the side object recognition unit which recognizes an object at the rear side of the host vehicle M are integrated as the object recognition device 54 in the above embodiment, the present invention is not limited thereto. These functional units may be provided independently.

In addition, it is possible to replace the constituent elements in the above embodiment with well-known constituent elements as appropriate without departing from the gist of the present invention.

REFERENCE SIGNS LIST

40 Side mirror
41 Mirror surface
42 Indicator (display unit)
54 Object recognition device (front object recognition unit, side object recognition unit)
56 HMI (warning sound generation unit)
160 Notification control unit
A1 First notification
A2 Second notification
Cm Intermediate portion
M Host vehicle

What is claim is:
1. A saddle-riding type vehicle, comprising:
a front object recognition unit which recognizes an object in front of a host vehicle;
a side object recognition unit which recognizes an object at the rear side of the host vehicle;

a display unit which notifies a driver of the existence of an object in the periphery of the host vehicle; and a notification control unit which determines the existence of an object in front of the host vehicle and the existence of an object at the rear side of the host vehicle on the basis of the recognition result of the front object recognition unit and the side object recognition unit and controls the display unit, wherein the notification control unit controls, when it is determined that there is an object at the rear side of the host vehicle, the display unit to display a first notification which is composed of a first sign and controls, when it is determined that there is an object at the rear side of the host vehicle and there is an object in front of the host vehicle, the display unit to display a second notification which is formed of the first sign and a second sign overlapping and is different from the first notification.

2. The saddle-riding type vehicle according to claim 1, wherein the notification control unit changes a display mode of the second notification in accordance with a vehicle speed of the host vehicle.

3. The saddle-riding type vehicle according to claim 1, comprising:

a warning sound generation unit which emits a warning sound, wherein the notification control unit controls the warning sound generation unit so that a warning sound is emitted when the vehicle speed has not decreased by a prescribed value or more within a prescribed time after the second notification has been displayed.

4. The saddle-riding type vehicle according to claim 1, wherein the display unit is provided on a side mirror and displays at least part of the second notification at a place of a mirror surface of the side mirror further inside in a vehicle width direction than an intermediate portion in the vehicle width direction.

5. The saddle-riding type vehicle according to claim 2, wherein the display unit is provided on a side mirror and displays at least part of the second notification at a place of a mirror surface of the side mirror further inside in a vehicle width direction than an intermediate portion in the vehicle width direction.

6. The saddle-riding type vehicle according to claim 3, wherein the display unit is provided on a side mirror and displays at least part of the second notification at a place of a mirror surface of the side mirror further inside in a vehicle width direction than an intermediate portion in the vehicle width direction.

* * * * *